(12) United States Patent
Ohtsuka et al.

(10) Patent No.: US 8,111,304 B2
(45) Date of Patent: Feb. 7, 2012

(54) IMAGE CAPTURING APPARATUS, IMAGE CAPTURING METHOD, AND COMPUTER READABLE MEDIUM IN WHICH AN IMAGE EXTRACTED IN ASSOCIATION WITH SELECTED OBJECT INFORMATION IS DISPLAYED

(75) Inventors: Shuichi Ohtsuka, Ashigarakami-gun (JP); Akira Yoda, Ashigarakami-gun (JP)

(73) Assignee: Fujifilm Corporation, Tokyo (JP)

( * ) Notice: Subject to any disclaimer, the term of this patent is extended or adjusted under 35 U.S.C. 154(b) by 963 days.

(21) Appl. No.: 11/912,701

(22) PCT Filed: Mar. 30, 2006

(86) PCT No.: PCT/JP2006/307276
§ 371 (c)(1),
(2), (4) Date: Oct. 26, 2007

(87) PCT Pub. No.: WO2006/117968
PCT Pub. Date: Nov. 9, 2006

(65) Prior Publication Data
US 2009/0079847 A1   Mar. 26, 2009

(30) Foreign Application Priority Data

Apr. 27, 2005  (JP) .................................. 2005-130525
Mar. 16, 2006  (JP) .................................. 2006-072434

(51) Int. Cl.
*H04N 5/76* (2006.01)
*H04N 5/228* (2006.01)
*H04N 7/18* (2006.01)
(52) U.S. Cl. ................... 348/231.6; 348/222.1; 348/135
(58) Field of Classification Search .................. None
See application file for complete search history.

(56) References Cited

U.S. PATENT DOCUMENTS 6,600,828 B1   7/2003   Kawamura
(Continued)

FOREIGN PATENT DOCUMENTS

JP   10177642 A   6/1998
(Continued)

OTHER PUBLICATIONS

Japanese Office Action for Appln. S.N. 2006-072434, dated Feb. 22, 2011 with Summary of Notice of Reasons for Rejection.

*Primary Examiner* — Justin P Misleh
(74) *Attorney, Agent, or Firm* — Sughrue Mion, PLLC

(57) ABSTRACT

There is provided an image capturing apparatus that automatically registers a taken object. The image capturing apparatus according to the present invention includes an object extracting section that extracts an object included in a captured image, a characteristic amount computing section that computes an amount of characteristic of the object based on the image with the object extracted from the object extracting section, a characteristic amount storing section that stores the amount of characteristic of the object computed from the characteristic amount computing section in association with object identification information identifying the object, a characteristic amount comparing section that compares an amount of characteristic of an object included in an image newly taken by an image capturing section and the amount of characteristic of the object stored on the characteristic amount storing section to compute a degree of coincidence of the objects, and an object identification information storing section that stores the object identification information stored on the characteristic amount storing section in association with the image newly taken by the image capturing section when it is judged that the degree of coincidence of the objects computed from the characteristic amount comparing section is not less than a predetermined reference value.

10 Claims, 12 Drawing Sheets

U.S. PATENT DOCUMENTS

| | | | |
|---|---|---|---|
| 6,940,545 B1 * | 9/2005 | Ray et al. .................... | 348/222.1 |
| 7,574,016 B2 * | 8/2009 | Steinberg et al. ............. | 382/103 |
| 7,652,709 B2 * | 1/2010 | Kanda et al. ............ | 348/333.02 |
| 2004/0119831 A1 | 6/2004 | Miyawaki | |
| 2009/0066815 A1 * | 3/2009 | Nozaki et al. ............ | 348/231.99 |

FOREIGN PATENT DOCUMENTS

| | | |
|---|---|---|
| JP | 2000050057 A | 2/2000 |
| JP | 2000299829 A | 10/2000 |
| JP | 2001069454 A | 3/2001 |
| JP | 2001161199 A | 6/2001 |
| JP | 2002314794 A | 10/2002 |
| JP | 2003-150932 | 5/2003 |
| JP | 2003141088 A | 5/2003 |
| JP | 2003150932 A | 5/2003 |
| JP | 2003274271 A | 9/2003 |
| JP | 2005026745 A | 1/2005 |
| JP | 2005-057360 | 3/2005 |
| JP | 2005057360 A | 3/2005 |
| JP | 2005101906 A | 4/2005 |

* cited by examiner

| OBJECT GROUP ID | OBJECT GROUP TITLE | OBJECT ID | OBJECT TITLE | IMAGE ID | | REPRESENTATIVE IMAGE ID |
|---|---|---|---|---|---|---|
| #401 | FAMILY | #431 | SUZUKI TARO | #451 | #452 | #452 |
| | | #432 | SUZUKI HANAKO | #451 | #453 | #453 |
| | | #433 | POCHI | #451 | ... | #451 |
| | | ... | ... | ... | ... | ... |
| #402 | COMPANY | #434 | TANAKA ZIRO | #454 | ... | #454 |
| | | ... | ... | ... | ... | ... |
| ... | ... | ... | ... | ... | ... | ... |

210

| OBJECT ID | AMOUNT OF CHARACTERISTIC |
|---|---|
| #431 | AMOUNT OF CHARACTERISTIC 431 |
| #432 | AMOUNT OF CHARACTERISTIC 432 |
| #433 | AMOUNT OF CHARACTERISTIC 433 |
| #434 | AMOUNT OF CHARACTERISTIC 434 |
| ⋮ | ⋮ |

*FIG. 4*

IMAGE CAPTURING APPARATUS, IMAGE CAPTURING METHOD, AND COMPUTER READABLE MEDIUM IN WHICH AN IMAGE EXTRACTED IN ASSOCIATION WITH SELECTED OBJECT INFORMATION IS DISPLAYED

CROSS REFERENCE TO RELATED APPLICATION

This is a national stage entry (35 U.S.C. §371) of the international application PCT/JP2006/307276 filed on Mar. 30, 2006 which claims priority from a Japanese Patent Application No. 2005-130525 filed on Apr. 27, 2005 and a Japanese Patent Application No 2006-072434 filed on Mar. 16, 2006, the contents of which are incorporated herein by reference.

BACKGROUND OF THE INVENTION

1. Technical Field

The present invention relates to an image capturing apparatus, an image capturing method, and a computer readable medium storing thereon a program. More particularly, the present invention relates to an image capturing apparatus and an image capturing method for taking an image, and a computer readable medium storing thereon a program for the image capturing apparatus.

2. Related Art

There is an image processing apparatus that generates scene characteristic information including a key frame within a scene, sections of the scene, a level of importance, and an image characteristic amount of the key frame and stores the scene characteristic information on a memory in association with a moving image, for each scene designated in moving image data. Such an image processing apparatus can carry out a digest replay replaying only a principal part of the designated moving image data or retrieve desired moving image data by means of similar image retrieval of the key frame, based on the scene characteristic information.

For example, when a user appreciates images made by recording a sports game, the user may designate a favorite player to effectively appreciate scenes on which the player comes out. However, according to the technique disclosed in Japanese Patent Application Publication 2000-299829, a user cannot effectively appreciate scenes including a specific subject designated by the user.

However, it is not preferable that a user inputs manually information specifying a subject every scene, because this places a burden on the user. Moreover, in recent years, with the increase of an amount of memory mounted on a digital camera, a digital video camera, or the like, it is possible to record a larger amount of image data. However, there has been a problem that it wastes the user's time to search for images, on which a specific subject comes out, from a large amount of image data.

SUMMARY OF THE INVENTION

Therefore, an advantage of some aspects of the invention is to provide an image capturing apparatus, an image capturing method, and a computer readable medium storing thereon a program that can solve the foregoing problems. The above and other objects can be achieved by combinations described in the independent claims. The dependent claims define further advantageous and exemplary combinations of the present invention.

According to the first aspect of the present invention, there is provided an image capturing apparatus. The apparatus includes: an image capturing section that takes an image; an object extracting section that extracts an object included in the image taken by the image capturing section; a characteristic amount computing section that computes an amount of characteristic of the object extracted from the object extracting section based on the image with the object extracted from the object extracting section; a characteristic amount storing section that stores the amount of characteristic of the object computed from the characteristic amount computing section in association with object identification information identifying the object; and an object identification information storing section that stores the object identification information identifying the object included in the image in association with the image taken by the image capturing section.

The image capturing apparatus may further include: a characteristic amount comparing section that compares an amount of characteristic of an object included in an image newly taken by the image capturing section and the amount of characteristic of the object stored on the characteristic amount storing section to compute a degree of coincidence of the objects; and a coincidence judging section that judges whether the degree of coincidence of objects computed from the characteristic amount comparing section is not less than a predetermined reference value, and the object identification information storing section may store the object identification information stored on the characteristic amount storing section in association with the image newly taken by the image capturing section when the coincidence judging section judges that the degree of coincidence of the object computed from the characteristic amount comparing section is not less than the predetermined reference value.

The characteristic amount computing section may compute a color of the object extracted from the object extracting section as an amount of characteristic, the characteristic amount storing section may store the color of the object computed from the characteristic amount computing section in association with object identification information, the characteristic amount comparing section may compare a color of an object included in an image newly taken by the image capturing section and the color of the object stored on the characteristic amount storing section to compute a degree of coincidence of objects, and the coincidence judging section may judge whether the degree of coincidence of objects computed from the characteristic amount comparing section is not less than the predetermined reference value.

The image capturing apparatus may further include: an object identification information selecting section that selects one object identification information from a plurality of object identification information stored on the object identification information storing section based on instruction input from a user; an image extracting section that extracts at least one image stored on the object identification information storing section in association with the object identification information selected by the object identification information selecting section; and a display section that displays at least one image extracted from the image extracting section.

The object identification information storing section may store a plurality of object identification information in association with object group identification information identifying a group of objects, and the object identification information selecting section may select one object group identification information from a plurality of object group identification information stored on the object identification information storing section based on instruction input from the user and then select one object identification information from the plurality of object identification information stored on the object identification information storing section based on instruction input from the user in association with the selected object group identification information.

The image capturing apparatus may further include a mode selecting section that selects a registration mode that is a mode for taking an object making the characteristic amount computing section compute an amount of characteristic to make the characteristic amount storing section store the amount of characteristic or an image capturing mode that is a mode for taking an image associated with object identification information stored on the object identification information storing section, the characteristic amount storing section may store the amount of characteristic of the object computed from the characteristic amount computing section in association with object identification information when the mode selecting section selects the registration mode, the characteristic amount comparing section may compare the amount of characteristic of the object included in the image taken by the image capturing section when the mode selecting section selects the image capturing mode and the amount of characteristic of the object stored on the characteristic amount storing section when the mode selecting section select the registration mode to compute a degree of coincidence of objects, the coincidence judging section may judge whether the degree of coincidence of objects computed from the characteristic amount comparing section is not less than the predetermined reference value, and the object identification information storing section may store the object identification information stored on the characteristic amount storing section when the mode selecting section selects the registration mode in association with the image newly taken by the image capturing section when the coincidence judging section judges that the degree of coincidence of the object computed from the characteristic amount comparing section is not less than the predetermined reference value.

The image capturing apparatus may further include: a display section that displays an image capturing area of the image capturing section; and a mark display controlling section that superimposes and displays a mark indicative of an area, in which an object making the characteristic amount computing section compute an amount of characteristic to make the characteristic amount storing section store the amount of characteristic should be taken, on the image capturing area of the image capturing section in the display section, the characteristic amount computing section may compute an amount of characteristic of an object in the area shown by the mark that is included in the image taken by the image capturing section and is displayed by the mark display controlling section, and the characteristic amount storing section may store the amount of characteristic of the object computed from the characteristic amount computing section in association with object identification information identifying the object.

The image capturing apparatus may further include a focusing area extracting section that extracts a focusing area that is an area focused in the image taken by the image capturing section, the object extracting section may extract an object included in the focusing area extracted from the focusing area extracting section, and the characteristic amount computing section may compute an amount of characteristic of the object extracted by the object extracting section from the focusing area based on the image with the object extracted by the object extracting section from the focusing area.

The image capturing section may take a moving image, the object extracting section may extract an object included in each frame of the moving image taken by the image capturing section, and the object identification information storing section may store object identification information identifying the object included in each frame in association with each frame of the moving image taken by the image capturing section.

The image capturing apparatus may further include: an object identification information selecting section that selects one object identification information from a plurality of object identification information stored on the object identification information storing section based on instruction input from the user; a frame extracting section that extracts at least one frame stored on the object identification information storing section in association with the object identification information selected by the object identification information selecting section; and a display section that displays at least one image extracted from the frame extracting section.

The object identification information storing section may embed the object identification information identifying the object included in the image in image data of the image taken by the image capturing section as digital watermark information.

According to the second aspect of the present invention, there is provided an image capturing method. The method includes: an image capturing step of taking an image; an object extracting step of extracting an object included in the image taken in the image capturing step; a characteristic amount computing step of computing an amount of characteristic of the object extracted in the object extracting step based on the image with the object extracted in the object extracting step; a characteristic amount storing step of storing the amount of characteristic of the object computed in the characteristic amount computing step in association with object identification information identifying the object; and an object identification information storing step of storing the object identification information identifying the object included in the image in association with the image taken in the image capturing step.

According to the third aspect of the present invention, there is provided a computer readable medium storing thereon a program for an image capturing apparatus that takes an image. The program makes the image capturing apparatus function as: an image capturing section that takes an image; an object extracting section that extracts an object included in the image taken by the image capturing section; a characteristic amount computing section that computes an amount of characteristic of the object extracted from the object extracting section based on the image with the object extracted from the object extracting section; a characteristic amount storing section that stores the amount of characteristic of the object computed from the characteristic amount computing section in association with object identification information identifying the object; and an object identification information storing section that stores the object identification information identifying the object included in the image in association with the image taken by the image capturing section.

According to the fourth aspect of the present invention, there is provided an image capturing apparatus. The apparatus includes: an image capturing section that takes an image; an object judging section that judges whether a predetermined specific object is included in the image taken by the image capturing section; an identification information acquiring section that acquires identification information previously associated with the object when the object judging section judges that the predetermined specific object is included in the image taken by the image capturing section; and an identification information recording section that embeds the identification information acquired by the identification information acquiring section in image data of the image taken by the image capturing section as digital watermark information.

The identification information recording section may embed the identification information acquired by the identification information acquiring section in the whole area of the image data of the image taken by the image capturing section as digital watermark information.

The identification information acquiring section may extract digital watermark information from image data for an image area of the object to acquire information shown by the extracted digital watermark information as identification information when the object judging section judges that the predetermined specific object is included in the image taken by the image capturing section, and the identification information recording section may embed the identification information acquired by the identification information acquiring section in the image data for the image taken by the image capturing section as digital watermark information.

The identification information recording section may embed, within a bit stream of image data showing the image taken by the image capturing section, the identification information acquired by the identification information acquiring section in bits other than the bit stream from which the identification information acquiring section extracts digital watermark information as digital watermark information.

The identification information recording section may embed, within a bit stream of image data showing the image taken by the image capturing section, the identification information acquired by the identification information acquiring section in bits showing a color component other than a color component shown by bits from which the identification information acquiring section extracts digital watermark information as digital watermark information.

The image capturing apparatus may further include a collateral information recording section that embeds captured time taken by the image capturing section in the image data for the image taken by the image capturing section as digital watermark information.

The image capturing apparatus may further include a collateral information recording section that embeds a captured position taken by the image capturing section in the image data for the image taken by the image capturing section as digital watermark information.

The identification information recording section may embed the identification information acquired by the identification information acquiring section as digital watermark information with embedding strength stronger than that of other information embedded as digital watermark information.

The identification information recording section may embed, within a bit stream of the image data showing the image taken by the image capturing section, the identification information acquired by the identification information acquiring section in higher-order bits than bits, in which other information is embedded as digital watermark information, as digital watermark information.

The identification information recording section may embed, within a bit stream of the image data showing the image taken by the image capturing section, a digital watermark of the identification information acquired by the identification information acquiring section by means of color components more than color components used for a digital watermark embedding other information.

According to the fifth aspect of the present invention, there is provided an image capturing method. The method includes: an image capturing step of taking an image; an object judging step of judging whether a predetermined specific object is included in the image taken in the image capturing step; an identification information acquiring step of acquiring identification information previously associated with the object when it is judged in the object judging step that the predetermined specific object is included in the image taken in the image capturing step; and an identification information recording step of embedding the identification information acquired in the identification information acquiring step in image data of the image taken in the image capturing step as digital watermark information.

According to the sixth aspect of the present invention, there is provided a computer readable medium storing thereon a program for an image capturing apparatus. The program makes the image capturing apparatus function as: an image capturing section that takes an image; an object judging section that judges whether a predetermined specific object is included in the image taken by the image capturing section; an identification information acquiring section that acquires identification information previously associated with the object when the object judging section judges that the predetermined specific object is included in the image taken by the image capturing section; and an identification information recording section that embeds the identification information acquired by the identification information acquiring section in image data of the image taken by the image capturing section as digital watermark information.

The summary of the invention does not necessarily describe all necessary features of the present invention. The present invention may also be a sub-combination of the features described above.

According to an aspect of the invention, it is possible to provide an image capturing apparatus that automatically registers a taken object.

BRIEF DESCRIPTION OF THE DRAWINGS

FIG. 3 is a view exemplary showing data stored on an object identification information selecting section in the form of table.

FIG. 4 is a view exemplary showing data stored on a characteristic amount storing section in the form of table.

DETAILED DESCRIPTION OF THE INVENTION

The invention will now be described with reference to some embodiments, which do not intend to limit the scope of the present invention, but exemplify the invention. All of the features and the combinations thereof described in the embodiment are not necessarily essential to the invention.

Figure 1:
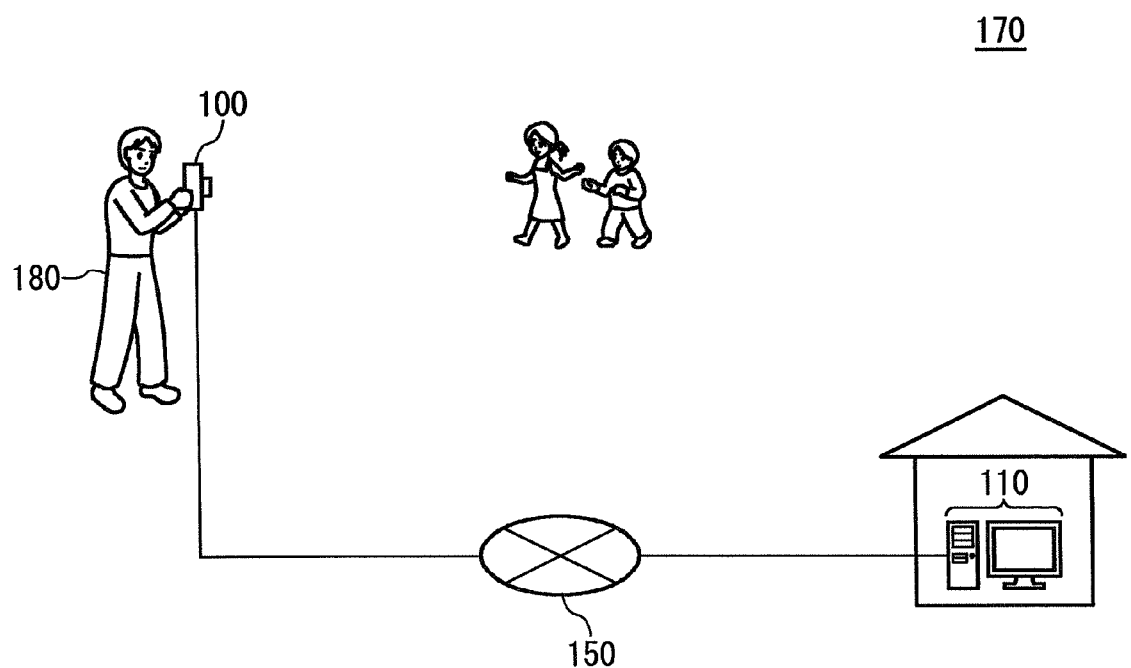
FIG. 1 is a view exemplary showing a use environment of an image capturing system.

FIG. 1 is a view exemplary showing a use environment of an image capturing system 170 according to an embodiment of the present invention. The image capturing system 170 includes an image capturing apparatus 100 and a personal computer 110. The image capturing apparatus 100 has an operation mode such as an image capturing mode for taking a subject and a registration mode for registering a subject while taking the subject. When a subject is taken with a registration mode, the image capturing apparatus 100 records the subject along with a special feature of the subject. Then, when a subject is taken with an image capturing mode, the image capturing apparatus 100 retrieves a subject identical with a special feature of the taken subject from subjects recorded in a registration mode to record the retrieved subject along with an image taken in an image capturing mode.

Moreover, the image capturing apparatus 100 shows a user 180 a list of subjects recorded in a registration mode to make the user 180 select a subject. Then, the image capturing apparatus 100 makes a display device such as a monitor screen of the image capturing apparatus 100 display an image including the selected subject.

The personal computer 110 receives images and subjects taken by the image capturing apparatus 100 via a communication line 150 such as Internet or a recording medium such as a semiconductor memory. Then, the personal computer 110 causes the user 180 to input a name of subject recorded in a registration mode by the image capturing apparatus 100 in order to record the name. Then, the personal computer 110 shows a list of names of the recorded subjects to the user 180 and makes the user 180 select a subject that the user wants to display. Then, the personal computer 110 makes an output device such as a display and a printer output an image including the selected subject. In addition, the personal computer 110 may make album data from a plurality of images including the subject selected by the user 180 and output the album data to the output device. In addition, the personal computer 110 may be a high-definition television, an electronic album, an electronic photo stand, or the like.

In addition, the image capturing apparatus 100 may receive a name of a subject from the personal computer 110 via the communication line 150. Moreover, the image capturing apparatus 100 may be a digital still camera or a video camera, or may be a personal digital assistant such as a camera-equipped portable telephone, a PDA having an image capturing function.

According to the image capturing apparatus 100 described above, it is possible to automatically record a name of a subject included in a captured image in the image. Then, the user 180 can easily select an image including a desirable subject by means of the image capturing apparatus 100 and the personal computer 110.

Figure 2:
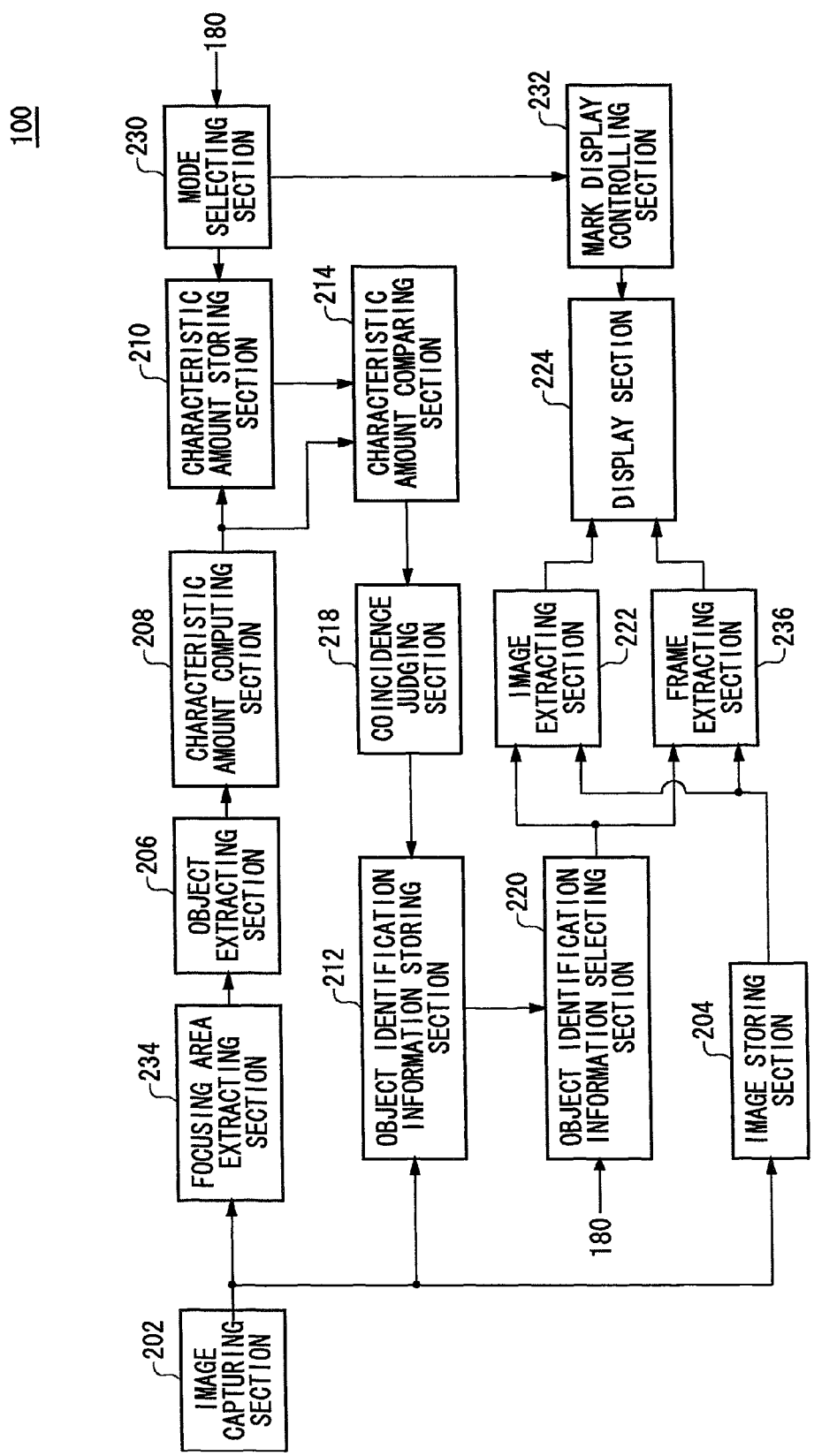
FIG. 2 is a view exemplary showing a block configuration of an image capturing apparatus.

FIG. 2 is a view exemplary showing a block configuration of the image capturing apparatus 100. The image capturing apparatus 100 includes an image capturing section 202, an image storing section 204, an object extracting section 206, a characteristic amount computing section 208, a characteristic amount storing section 210, an object identification information storing section 212, a characteristic amount comparing section 214, a coincidence judging section 218, an object identification information selecting section 220, an image extracting section 222, a display section 224, a mode selecting section 230, a mark display controlling section 232, a focusing area extracting section 234, and a frame extracting section 236.

The image capturing section 202 takes images. The image storing section 204 stores the images taken by the image capturing section 202. Specifically, the image storing section 204 stores the images taken by the image capturing section 202 and image IDs identifying the images. In addition, images in the present embodiment include a still image and a moving image.

The focusing area extracting section 234 extracts a focusing area that is a focused area in an image taken by the image capturing section 202. The focusing area extracting section 234 may judge a focusing area from a contrast of the image taken by the image capturing section 202. Moreover, a focusing area may be a predetermined partial area in an image area taken by the image capturing section 202.

The object extracting section 206 extracts an object included in the image taken by the image capturing section 202. In addition, the object extracting section 206 may extract an object included in the focusing area extracted from the focusing area extracting section 234. The object identification information storing section 212 stores object identification information identifying an object included in an image in association with the image taken by the image capturing section 202.

The characteristic amount computing section 208 computes an amount of characteristic of the object extracted from the object extracting section 206 based on the image with the object extracted from the object extracting section 206. In addition, the characteristic amount computing section 208 may compute an amount of characteristic of the object extracted from a focusing area by the object extracting section 206 based on the image with the object extracted from the focusing area by the object extracting section 206. Then, the characteristic amount storing section 210 stores the amount of characteristic of the object computed from the characteristic amount computing section 208 in association with object identification information identifying the object.

The characteristic amount comparing section 214 compares an amount of characteristic of an object included in an image newly taken by the image capturing section 202 and the amount of characteristic of the object stored on the characteristic amount storing section 210 to compute a degree of coincidence of objects. Then, the coincidence judging section 218 judges whether the degree of coincidence of objects computed from the characteristic amount comparing section 214 is not less than a predetermined reference value.

When the coincidence judging section 218 judges that the degree of coincidence of objects computed from the characteristic amount comparing section 214 is not less than the predetermined reference value, the object identification information storing section 212 stores the object identification information stored on the characteristic amount storing section 210 in association with the image newly taken by the image capturing section 202. For this reason, the image capturing apparatus 100 can automatically record an object included in a newly taken image.

In addition, the characteristic amount computing section 208 may compute a color of the object extracted from the object extracting section 206 as an amount of characteristic. In this case, the characteristic amount storing section 210 stores the color of object computed from the characteristic amount computing section 208 in association with object identification information. Then, the characteristic amount comparing section 214 compares a color of an object included in an image newly taken by the image capturing section 202 and the color of object stored on the characteristic amount storing section 210 to compute a degree of coincidence of objects. Then, the coincidence judging section 218 judges whether the degree of coincidence of objects computed from the characteristic amount comparing section 214 is not less than a predetermined reference value.

The object identification information selecting section 220 selects one object identification information from a plurality of object identification information stored on the object identification information storing section 212 based on instruction input from the user 180. Then, the image extracting section 222 extracts at least one image stored on the object identification information storing section 212 in association with the object identification information selected by the object identification information selecting section 220. Specifically, the image extracting section 222 selects at least one image ID stored on the object identification information storing section 212 in association with the object identification information selected by the object identification information selecting section 220, and extracts an image stored on the image storing section 204 in association with the image ID. Then, the display section 224 displays at least one image extracted from the image extracting section 222. For this reason, the user 180 can make the image capturing apparatus 100 easily display an image including an object that the user 180 wants to display.

In addition, the object identification information storing section 212 stores a plurality of object identification information in association with object group identification information identifying a group of objects. Then, the object identification information selecting section 220 selects one object group identification information from a plurality of object group identification information stored on the object identification information storing section 212 based on instruction input from the user 180, and then selects one object identification information from the plurality of object identification information stored on the object identification information storing section 212 in association with the selected object group identification information based on instruction input from the user 180. In this manner, since the image capturing apparatus 100 first makes the user 180 select a group of objects, the user 180 can quickly select an object to be displayed.

The mode selecting section 230 selects a registration mode that is a mode for taking an object that makes the characteristic amount computing section 208 compute an amount of characteristic to make the characteristic amount storing section 210 store the amount of characteristic, or an image capturing mode that is a mode for taking an image that is associated with the object identification information stored on the object identification information storing section 212. Then, when the mode selecting section 230 selects a registration mode, the characteristic amount storing section 210 stores the amount of characteristic of object computed from the characteristic amount computing section 208 in association with object identification information.

Then, the characteristic amount comparing section 214 compares the amount of characteristic of object included in the image taken by the image capturing section 202 when the mode selecting section 230 selects an image capturing mode and the amount of characteristic of object stored on the characteristic amount storing section 210 when the mode selecting section 230 selects a registration mode, in order to compute a degree of coincidence of objects. Then, the coincidence judging section 218 judges whether the degree of coincidence of objects computed from the characteristic amount comparing section 214 is not less than a predetermined reference value. Then, when the coincidence judging section 218 judges that the degree of coincidence of objects computed from the characteristic amount comparing section 214 is not less than the predetermined reference value, the object identification information storing section 212 stores the object identification information stored on the characteristic amount storing section 210 in association with the image newly taken by the image capturing section 202 when the mode selecting section 230 selects a registration mode. For this reason, the user 180 can make the image capturing apparatus 100 previously register an object to be recorded. Then, the image capturing apparatus 100 can automatically record an object included in an image when the previously registered object is taken newly.

The display section 224 displays an image capturing area of the image capturing section 202. In addition, the image capturing apparatus 100 may further have a display mode for making the display section 224 display at least one image extracted from the image extracting section 222 in addition to a registration mode and an image capturing mode. Then, the mode selecting section 230 may set the image capturing apparatus 100 to either of a registration mode, an image capturing mode, or a display mode according to instruction from the user 180.

The mark display controlling section 232 superimposes and displays a mark showing an area, in which an object making the characteristic amount computing section 208 compute an amount of characteristic to make the characteristic amount storing section 210 store the amount of characteristic should be taken, on the image capturing area of the image capturing section 202 on the display section 224. Then, the characteristic amount computing section 208 computes an amount of characteristic of an object existing in an area shown by the mark displayed by the mark display controlling section 232, which is included in the image taken by the image capturing section 202. Then, the characteristic amount storing section 210 stores the amount of characteristic of object computed from the characteristic amount computing section 208 in association with object identification information identifying the object.

For example, the display section 224 may be a monitor screen such as a digital still camera that shows an area taken by the image capturing section 202 and an image capturing condition to the user 180. Then, when the image capturing apparatus 100 is set to a registration mode, the image capturing apparatus 100 superimposes and displays a mark showing an area, in which an object making the characteristic amount storing section 210 store an amount of characteristic should be taken, on the image in the image capturing area taken by the image capturing section 202. For this reason, the user 180 can easily designate an object to be registered in the image capturing apparatus 100 by adding the mark to the object that the user wants to register.

In addition, when the image capturing section 202 takes a moving image, the object extracting section 206 extracts an object included in each frame of the moving image taken by the image capturing section 202. Then, the object identification information storing section 212 stores object identification information identifying the object included in each frame in association with each frame of the moving image taken by the image capturing section 202.

Then, the object identification information selecting section 220 selects one object identification information from the plurality of object identification information stored on the object identification information storing section 212 based on instruction input from the user 180. Then, the frame extracting section 236 extracts at least one frame stored on the object identification information storing section 212 in association with the object identification information selected by the object identification information selecting section 220. Then, the display section 224 displays at least one image extracted from the frame extracting section 236. Specifically, the display section 224 displays at least one image extracted from the frame extracting section 236 as a moving image.

In addition, the object identification information storing section 212 may embed object identification information identifying the object included in the image in image data for the image taken by the image capturing section 202 as digital watermark information.

According to the image capturing apparatus 100 described above, it is possible to previously take and register a subject in which the user 180 takes an interest and automatically record the effect, which the subject is included in a captured image, in the captured image when the subject is taken again. For this reason, since the user 180 does not need to manually input subject information included in an image whenever the image is taken, the user can concentrate on image capturing activity making use of the image capturing apparatus 100. Further, the user 180 can easily classify and arrange images every subject by means of the image capturing apparatus 100 and effectively select images including the subject that the user wants to appreciate to appreciate the images.

FIG. 3 is a view exemplary showing data stored on the object identification information selecting section 220 in the form of table. The object identification information selecting section 220 stores an object group ID identifying each object group, an object group title named to each object group, an object ID identifying each object, an object title named to each object, an image ID showing an image including an object, and a representative image ID showing a representative image of an object.

In addition, an object title may be provided by being manually input by the user 180. Moreover, the object identification information storing section 212 may store, as a representative image ID, one or more image IDs identifying an image taken when the image capturing apparatus 100 is set to a registration mode. In addition, the object identification information in the present embodiment may be an object ID. Alternatively, the object identification information may be an object title, or may be a representative image ID showing an image taken when being set to a registration mode.

In addition, the object group title and the object title among data stored on the object identification information storing section 212 may manually be input from the user 180 by means of the personal computer 110. For example, during taking images by the image capturing apparatus 100, the image capturing apparatus 100 will assign an object ID. Then, the personal computer 110 may acquire data from the object identification information storing section 212 to store an object title by manual input from the user 180. Moreover, the personal computer 110 may store an object group title by manual input from the user 180.

In addition, the object identification information storing section 212 may extract a set of object identification information of objects appearing in the same image in the ratio higher than a predetermined ratio based on a plurality of object identification information stored in association with the same image, in order to store the extracted set of object identification information in association with the same object group identification information. In this way, the image capturing apparatus 100 can automatically record appropriate object group identification information without making the user 180 designate object group identification information for each of objects.

In addition, the personal computer 110 may acquire data from the object identification information storing section 212 and the image storing section 204, and show the user 180 the object identification information stored on the object identification information storing section 212 to make the user select it. For example, the personal computer 110 displays a list of images stored on the image storing section 204 on a display device such as a display in association with a representative image ID stored on the object identification information storing section 212 every object ID, in order to make the user 180 select it by means of an operation of a mouse or the like. Then, the personal computer 110 may display an image having an image selected by the user 180 as a representative image ID on a display device such as a display.

Moreover, the object identification information storing section 212 may record object identification information in image data of the image taken by the image capturing section 202 as electronic embedding information. In this manner, since the object identification information storing section 212 deeply encodes object identification information and records it in image data itself, the object identification information is recorded in image data itself. In this way, it is possible to beforehand prevent loss of object identification information caused by rewriting tag information of an image compared with when object identification information is recorded as tag information of an image.

FIG. 4 is a view exemplary showing data stored on the characteristic amount storing section 210 in the form of table. The characteristic amount storing section 210 stores an object ID and an amount of characteristic. In addition, an amount of characteristic is a shape profile of a face, or a shape of a distinctive part in a face, a position of each part in the whole face or a positional relationship between parts, in which the parts are eyes, a nose, a mouth, when an object is a figure. Moreover, when an object is an animal, an amount of characteristic may be a shape profile such as hands and feet or a body. Moreover, when an object is an artifact such as a wedding dress or a ship, the characteristic amount storing section 210 may store a shape profile of the whole object as an amount of characteristic. Moreover, the characteristic amount storing section 210 may extract a distinctive color in a distinctive part of an object such as a color of a face, a color of an eye of a figure, a color of a body of an animal, in order to store the extracted one or more colors as an amount of characteristic.

In addition, the characteristic amount comparing section 214 compares an amount of characteristic computed from the characteristic amount computing section 208 in regard to an object included in a newly taken image with an amount of characteristic every object ID stored on the characteristic amount storing section 210, in order to compute a degree of coincidence between them. In addition, a degree of coincidence may be a ratio of square measure of an overlapped area to square measure shown by the whole outline, for example, when matching an outline of a distinctive part extracted from a newly taken object with an outline of a distinctive part stored on the characteristic amount storing section 210 every object. Besides, a degree of coincidence may be a ratio of the number of colors included in color space same as a distinctive color stored on the characteristic amount storing section 210 every object ID, among distinctive colors extracted from a newly taken object.

Figure 5:
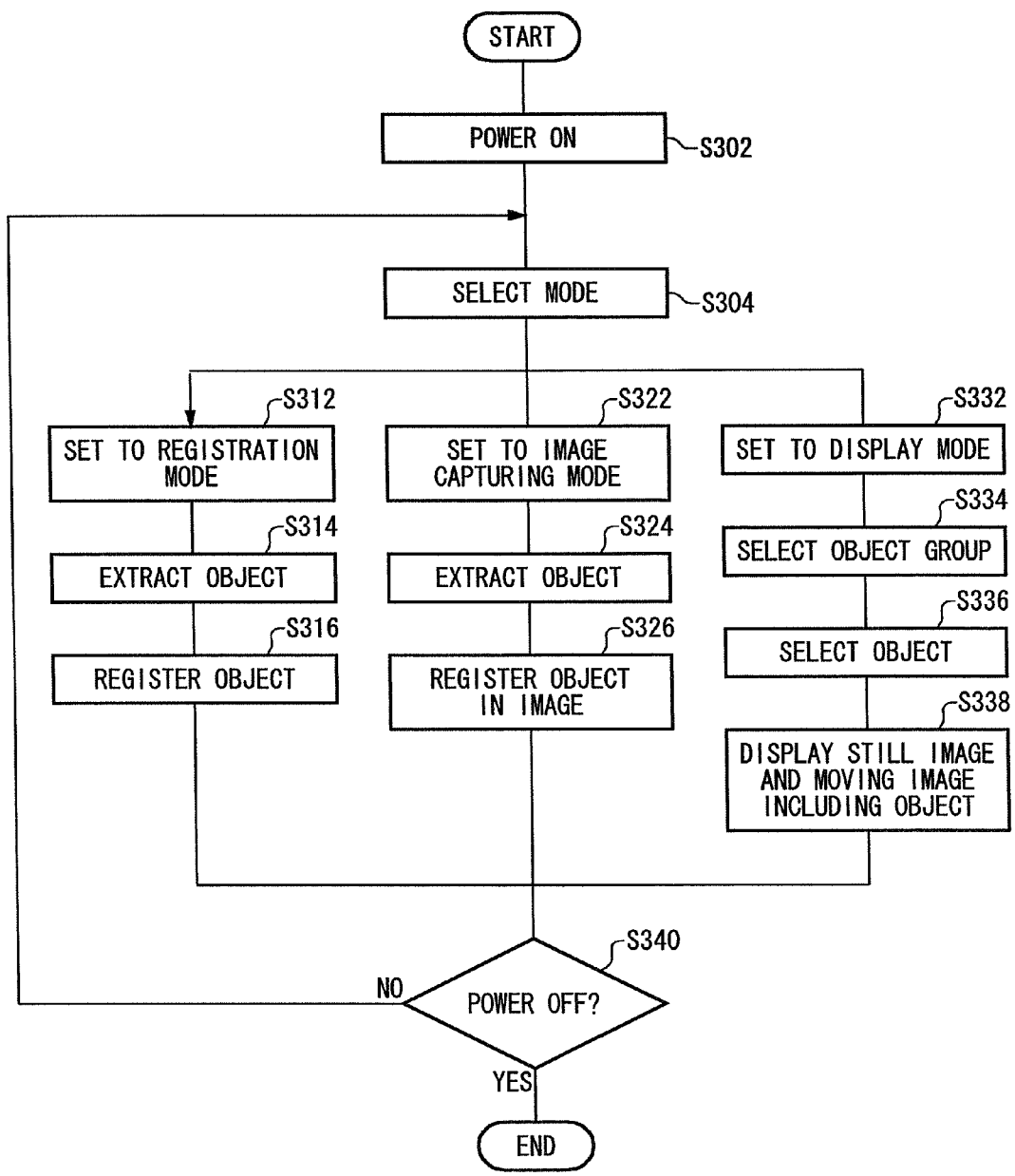
FIG. 5 is a view exemplary showing an operation flow of an image capturing apparatus.

FIG. 5 is a view exemplary showing an operation flow of the image capturing apparatus 100. The image capturing apparatus 100 starts an operation by turning on a power button by the user 180 (S302). Then, the image capturing apparatus 100 accepts an appointment of an operation mode from the user 180 (S304). For example, the image capturing apparatus 100 may accept an appointment of an operation mode from the user 180 by the user 180 pushing down an operation mode instruction button designating an operation mode. Then, in S304, the image capturing apparatus 100 sets an operation mode to a registration mode when the registration mode is designated by an operation of the operation mode instruction button by the user 180 (S312). Then, the object extracting section 206 extracts an object from an image taken by the image capturing section 202 (S314). Then, the image capturing apparatus 100 stores an amount of characteristic of the object on the characteristic amount storing section 210, and stores object identification information on the object identification information storing section 212 (S316).

In addition, for an image already taken by the image capturing section 202, the image capturing apparatus 100 may make the characteristic amount computing section 208 compute an amount of characteristic of the image to make the characteristic amount storing section 210 store the amount of characteristic, when the image capturing apparatus 100 is set to a registration mode. For example, the image capturing apparatus 100 may make the user 180 select an image from images stored on the image storing section 204 and then accept an instruction showing a registration mode from the user 180 to process steps S314 and S316 for the selected image. In this case, the object identification information storing section 212 may select an image ID including an object of which an amount of characteristic is identical with an amount of characteristic of the object newly registered in S316 in a degree of coincidence exceeding a reference value, and store an object ID of the newly registered object in association with the image ID.

Moreover, in S304, the image capturing apparatus 100 sets an operation mode to an image capturing mode when an image capturing mode is designated by an operation of the operation mode instruction button by the user 180 (S322). Then, the object extracting section 206 extracts an object from an image taken by the image capturing section 202 (S324). Then, the object identification information storing section 212 stores an image ID in association with an object ID of an object in which an amount of characteristic is identical in a degree of coincidence exceeding a reference value by the coincidence judging section 218 (S326).

Moreover, in S304, the image capturing apparatus 100 sets an operation mode to a display mode when a display mode is designated by an operation of the operation mode instruction button by the user 180 (S332). Then, the image capturing apparatus 100 makes the user 180 select a group of objects (S334). Then, the image capturing apparatus 100 makes the user 180 select an object to be displayed from objects included in a group of objects selected in S334 (S336). Then, the image extracting section 222 extracts an image including the object designated in S336 to display the image on the display section 224 (S338).

In addition, when the image capturing section 202 takes a new image, the coincidence judging section 218 does not compute a degree of coincidence, and the characteristic amount storing section 210 may assign temporary object identification information to the object extracted from the object extracting section 206 and store an amount of characteristic in association with the temporary object identification information. Then, when the image capturing apparatus 100 is set to a display mode, the image capturing apparatus 100 may retrieve another object identification information identical with an amount of characteristic of the object selected by the user 180 in a degree of coincidence exceeding a reference value, from object identification information stored on the characteristic amount storing section 210, in order to display an image including an object shown by the retrieved object identification information on the display section 224. In this case, since the image capturing apparatus 100 does not need to retrieve the characteristic amount storing section 210 whenever taking an image to judge whether the amounts of characteristic are identical with each other, the user 180 can continue image capturing activity without waiting for processing time by the coincidence judging section 218.

In addition, the image capturing apparatus 100 may have a waiting state waiting for an operation from the user 180 in each operation mode including a registration mode, an image capturing mode, and a display mode. For example, when an operation from the user 180 is not for a predetermined time, the image capturing apparatus 100 stops an operation in each operation mode and shifts to a waiting state. Then, when the image capturing apparatus 100 shifts to a waiting state, the image capturing apparatus 100 may retrieve another object identification information, of which an amount of characteristic is identical with an amount of characteristic stored on the characteristic amount storing section 210 in association with the temporary object identification information in a degree of coincidence exceeding a reference value, from object identification information stored on the characteristic amount storing section 210, in order to store the image on the object identification information storing section 212 in association with the retrieved object identification information. For this reason, since the image capturing apparatus 100 can perform a judgment process of a degree of coincidence by the coincidence judging section 218 while the user 180 does not perform an operation, the user 180 can continue to take images without waiting for processing time by the coincidence judging section 218.

In addition, when operations in steps S316, S326, and S338 are terminated, it is judged whether an operation of power-off has been performed (S340). The process shifts to S304 when an operation of power-off has not been performed in S340, and the process is terminated when an operation of power-off has been performed in S340.

Figure 6:
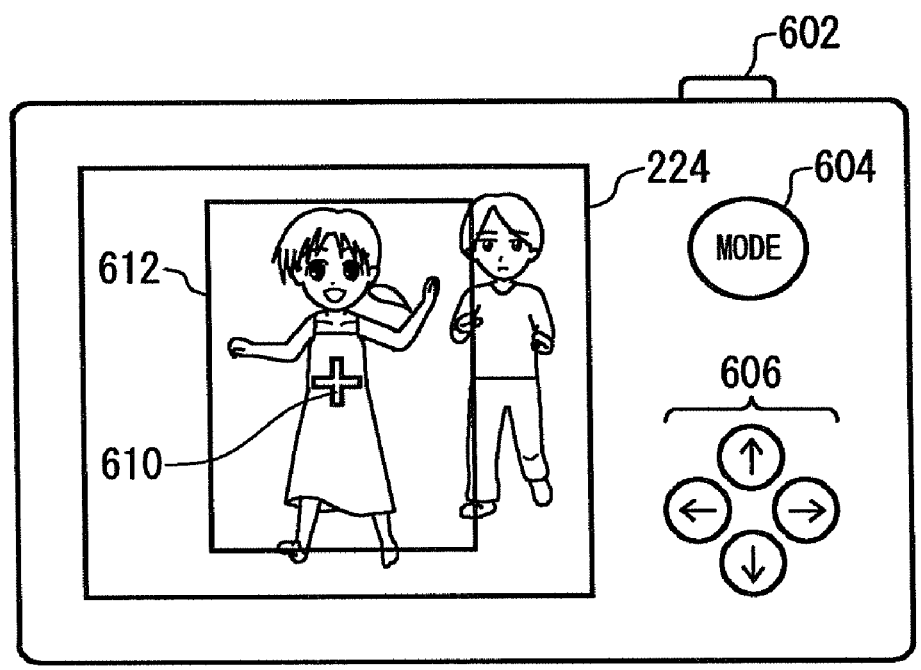
FIG. 6 is a view exemplary showing a structure of an image capturing apparatus.

FIG. 6 is a view exemplary showing a structure of the image capturing apparatus 100. The image capturing apparatus 100 includes a release button 602, an operation mode selection button 604, and a mobile button 606. The image capturing section 202 acquires an image taken in a timing in which the user 180 pushes down the release button 602.

In addition, the operation mode selection button 604 is an example of an operation mode instruction button. The image capturing apparatus 100 switches an operation mode to either of a registration mode, an image capturing mode, or a display mode whenever the user 180 pushes down the operation mode button 604. In addition, an operation mode instruction button may be the release button 602. For example, the image capturing apparatus 100 may shift to a registration mode when the user 180 half pushes the release button 602, and extract an object from an image acquired in the half-pushed timing to store an amount of characteristic on the characteristic amount storing section 210.

When the image capturing apparatus 100 is set to a registration mode by the mode selecting section 230, the mark display controlling section 232 displays a mark 610 on a display area of the display section 224. Then, the user 180 adds the mark 610 on the display area of the display section 224 to an object that the user wants to register, in order to designate the object to be registered in the image capturing apparatus 100. In addition, the mark display controlling section 232 may display the mark 610 on a predetermined area such as a central area in the display area of the display section 224. In addition, the mark display controlling section 232 may move a display position of the mark 610 in the display area of the display section 224 according to an operation of the mobile button 606 by the user 180.

Moreover, when the image capturing apparatus 100 is set to a registration mode by the mode selecting section 230, the mark display controlling section 232 may displays a mark 612 showing a frame, in which a desirable object should be put, on the display area of the display section 224. Then, the user 180 may put the object that the user wants to register in the frame shown by the mark 612 on the display area of the display section 224, in order to designate an object to be registered in the image capturing apparatus 100. In addition, the mark display controlling section 232 may move a display position of the mark 612 in the display area of the display section 224 by an operation of the mobile button 606 by the user 180.

In addition, when the image capturing apparatus 100 is set to a display mode, the object identification information selecting section 220 makes the display section 224 display a plurality of object identification information stored on the object identification information storing section 212 to show them to the user 180. Then, the user 180 may select object identification information of the object that the user wants to display from the plurality of shown object identification information by a cursor movement using the mobile button 606.

According to the image capturing apparatus 100 described above, it is possible to record an object included in a captured image along with the image without bothering a hand of the user 180. For this reason, the user 180 can easily select an image including an object that the user wants to display by means of the image capturing apparatus 100 and/or the personal computer 110. Therefore, the user 180 can easily arrange images every subject, or easily select an image in which a subject that the user wants to appreciate has been taken when appreciating images.

Figure 7:
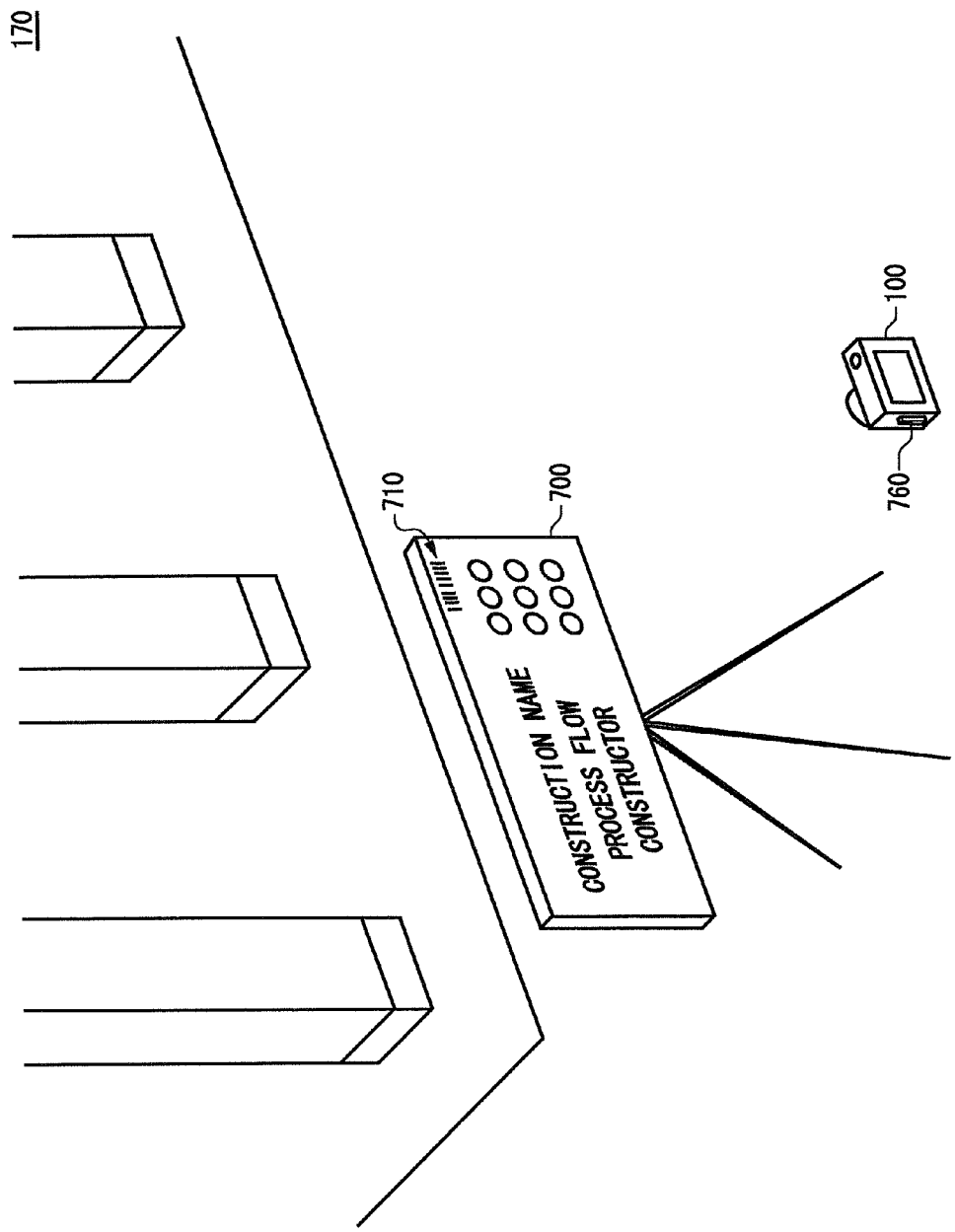
FIG. 7 is a view exemplary showing another use environment of an image capturing system.

FIG. 7 is a view exemplary showing a use environment of an image capturing system 170 according to another embodiment. For example, the image capturing system 170 is used for taking photographs for construction being taken for a construction record and work progress confirmation data after construction completion. The image capturing apparatus 100 takes a construction photograph including a blackboard for construction photograph 700. The images obtained in this way are utilized to authenticate that the construction is regular construction. On the blackboard for construction photograph 700 is recorded construction information such as a construction name, a process flow, and a constructor, and the image capturing apparatus 100 takes a construction field including the blackboard for construction photograph 700 to record the taken photograph in a recording medium 760 as an image.

At this time, the image capturing apparatus 100 extracts an image area of the blackboard for construction photograph 700 from the captured image. Then, the image capturing apparatus 100 extracts a bar-code 710 identifying the construction from the extracted image area. For example, the bar-code 710 is a number to identify construction and a builder executing the construction, and is previously associated with a construction identification ID and a builder ID. Then, the image capturing apparatus 100 acquires a construction identification ID and a builder ID associated with a number shown by the bar-code 710.

In addition, as described in the above embodiment, when taking the blackboard for construction photograph 700 in a registration mode registering an object, the image capturing apparatus 100 may previously record a construction identification ID and a builder ID input as an object title or the like along with a value shown by the bar-code 710. Then, when the bar-code 710 is detected from the image for the blackboard for construction photograph 700 taken by the image capturing apparatus 100 in an image capturing mode, the image capturing apparatus 100 acquires the construction identification ID and the builder ID previously recorded in association with a number shown by the bar-code 710 to embed these IDs in the image taken by the image capturing apparatus 100. At this time, the image capturing apparatus 100 embeds the construction identification ID and the builder ID in the whole area of the image as digital watermark information.

In addition, the construction identification ID and the builder ID may be previously recorded in the recording medium 760 in association with the number shown by the bar-code 710. Moreover, the construction identification ID and the builder ID may be encoded and recorded in the recording medium 760 in association with the number shown by the bar-code 710. Moreover, this recording medium 760 may be provided along with the bar-code 710 from a government office supervising construction. Moreover, a database that can communicate with the image capturing apparatus 100 may record the construction identification ID and the builder ID in association with the bar-code 710. Then, the image capturing apparatus 100 may acquire the construction identification ID and the builder ID stored on the database in association with the number shown by the bar-code 710. The image capturing apparatus 100 may acquire the construction identification ID and the builder ID from the database via a communication line such as Internet. In addition, a value itself shown by the bar-code 710 may show the construction identification ID and the builder ID.

Moreover, information identifying the construction identification ID and the builder ID may be embedded in the blackboard for construction photograph 700 as a watermark. Then, the image capturing apparatus 100 may acquire the construction identification ID and the builder ID from information extracted by analyzing the watermark detected from an image in which the blackboard for construction photograph 700 is taken, in order to record the acquired construction identification ID and builder ID in the captured image as a digital watermark. According to the image capturing apparatus 100 described above, since information identifying construction is recorded in the whole area of a construction photograph as a digital watermark, it is possible to raise tolerance to interpolation for the construction photograph.

Figure 8:
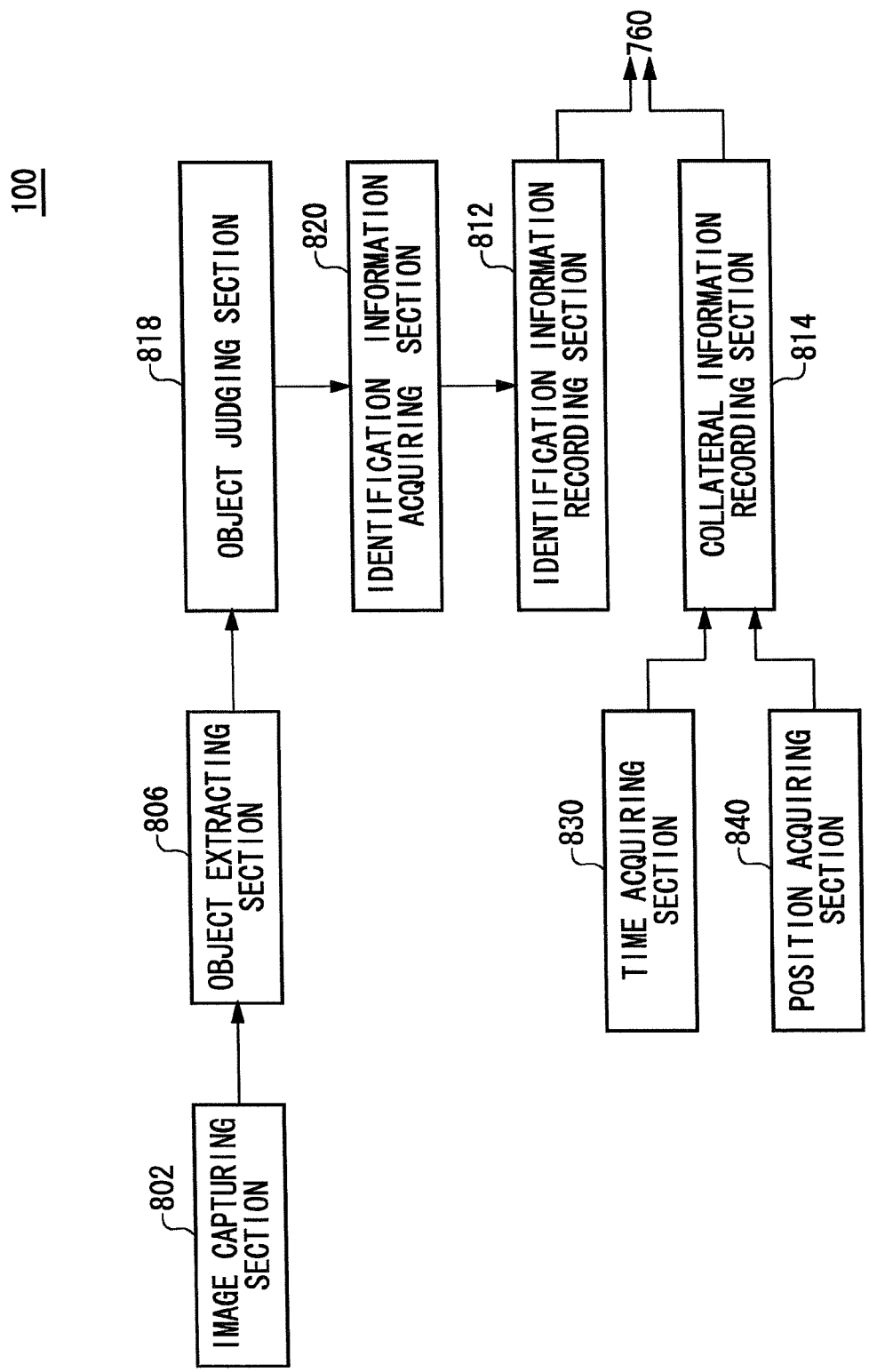
FIG. 8 is a view exemplary showing a block configuration of an image capturing apparatus.

FIG. 8 is a view exemplary showing a block configuration of an image capturing apparatus 100. The image capturing apparatus 100 includes an image capturing section 802, an object extracting section 806, an object judging section 818, an identification information acquiring section 820, an identification information recording section 812, a collateral information recording section 814, a time acquiring section 830, and a position acquiring section 840. For example, the image capturing apparatus 100 may be an image capturing apparatus such as a digital still camera or a digital video camera.

The image capturing section 802 takes images. For example, the image capturing section 802 takes images by receiving light from a subject by means of a photo detector such as a CCD. The object judging section 818 judges whether a predetermined specific object is included in an image taken by the image capturing section 802. Then, when the object judging section 818 judges that the predetermined specific object is included in the image taken by the image capturing section 802, the identification information acquiring section 820 acquires identification information previously associated with the object. Then, the identification information recording section 812 embeds the identification information acquired by the identification information acquiring section 820 in image data for the image taken by the image capturing section 802 as digital watermark information. In addition, the identification information recording section 812 embeds the identification information acquired by the identification information acquiring section 820 in the whole area of image data for the image taken by the image capturing section 802 as digital watermark information. In this way, it is possible to raise tolerance to interpolation of construction photographs and interpolation of images.

In addition, when the object judging section 818 judges that the predetermined specific object is included in the image taken by the image capturing section 802, the identification information acquiring section 820 extracts digital watermark information from image data of an image area of the object to acquire information shown by the extracted digital watermark information as identification information. Then, the identification information recording section 812 embeds the identification information acquired by the identification information acquiring section 820 in image data for the image taken by the image capturing section 802 as digital watermark information.

Moreover, the identification information recording section 812 embeds, within a bit stream of image data showing the image taken by the image capturing section 802, the identification information acquired by the identification information acquiring section 820 in bits other than the bit stream from which the identification information acquiring section 820 extracts digital watermark information as digital watermark information. Moreover, the identification information recording section 812 embeds, within a bit stream of image data showing the image taken by the image capturing section 802, the identification information acquired by the identification information acquiring section 820 in bits showing a color component other than a color component shown by bits from which the identification information acquiring section 820 extracts digital watermark information as digital watermark information. For this reason, the image capturing apparatus 100 can record the watermark information and the identification information embedded in a subject in the same image. Therefore, it is possible to further raise tolerance to interpolation of images.

The collateral information recording section 814 embeds a captured time taken by the image capturing section 802 in image data for the image taken by the image capturing section 802 as digital watermark information. Moreover, the collateral information recording section 814 embeds a captured position taken by the image capturing section 802 in image data for the image taken by the image capturing section 802 as digital watermark information. In addition, the collateral information recording section 814 embeds the captured time and the captured position in the whole area of the image as digital watermark information. In this manner, since the image capturing apparatus 100 embeds the captured position and the captured time in the image as watermark information, it is possible to check whether a construction photograph is reasonable using an image itself if required. Moreover, the identification information recording section 812 embeds the identification information acquired by the identification information acquiring section 820 as digital watermark information with embedding strength stronger than that of other information embedded as digital watermark information. For this reason, it is hard to lose more important identification information such as a builder ID.

Moreover, as another method for changing embedding strength, the identification information recording section 812 may embed, within a bit stream of the image data showing the image taken by the image capturing section 802, the identification information acquired by the identification information acquiring section 820 in higher-order bits than bits, in which other information is embedded as digital watermark information, as digital watermark information. Moreover, the identification information recording section 812 may embed, within a bit stream of the image data showing the image taken by the image capturing section 802, a digital watermark of the identification information acquired by the identification information acquiring section 820 by means of color components more than color components used for a digital watermark embedding other information.

Figure 9:
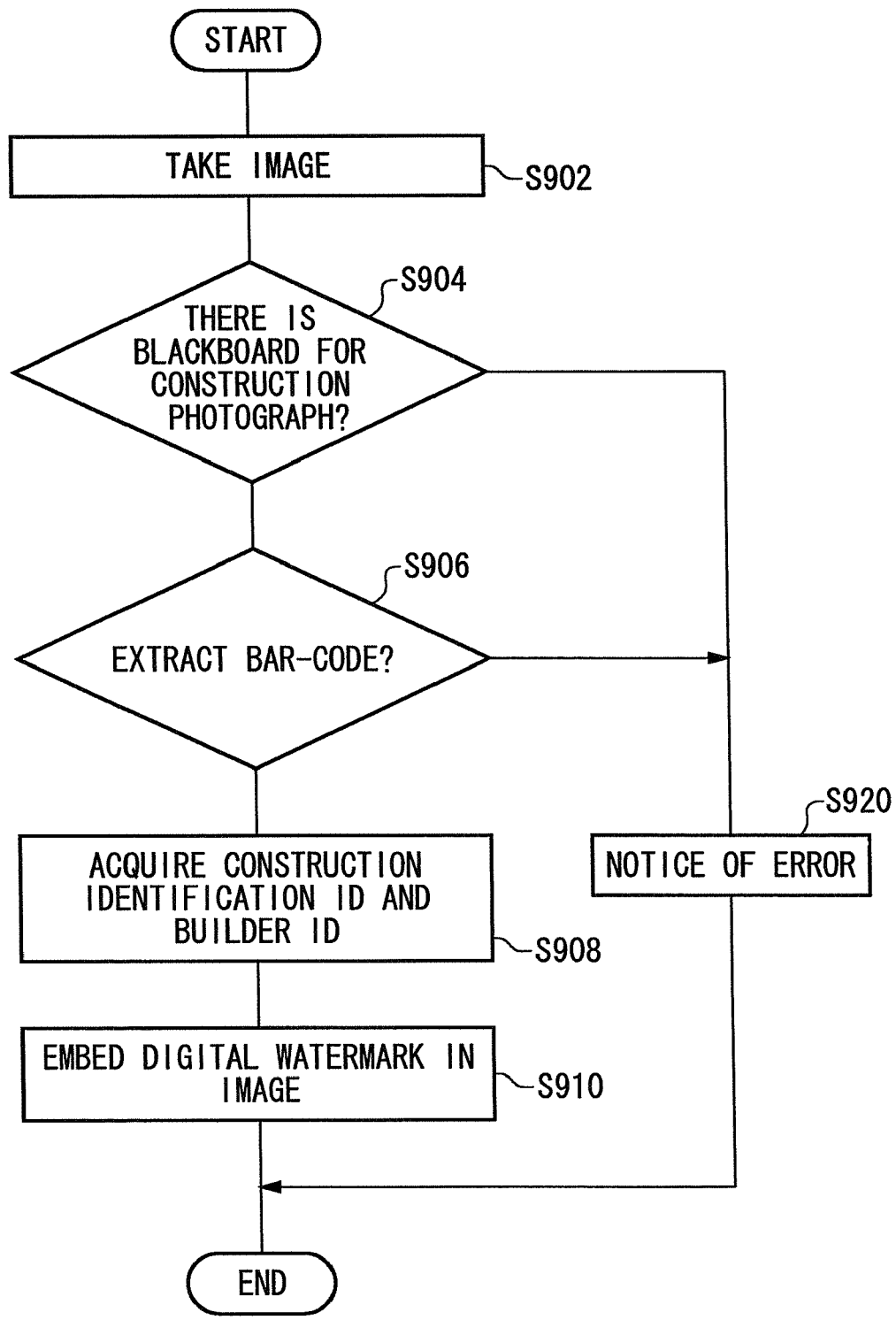
FIG. 9 is a view exemplary showing an image capturing flow.

FIG. 9 is a view exemplary showing an image capturing flow by the image capturing apparatus 100. The image capturing section 802 takes images (S902). Then, the object extracting section 806 extracts an object included in the image taken in step S902. Then, the object judging section 818 judges whether the extracted object is the blackboard for construction photograph (S904). The object judging section 818 may store a judgment condition such as a shape and a color of a predetermined blackboard for construction photograph, and judge whether the extracted object is the blackboard for construction photograph based on the judgment condition.

In S904, when it is judged that the extracted object is the blackboard for construction photograph, the identification information acquiring section 820 judges whether a bar-code is included in the object (S906). Then, when it is judged that a bar-code is included in S906, the identification information acquiring section 820 acquires a construction ID and a builder ID associated with a value shown by the extracted bar-code (S908). Then, the construction ID and the builder ID acquired in S908 are embedded in the whole area of the image captured in S902 as a digital watermark (S910).

In addition, when it is judged that the object extracted in S904 is not the blackboard for construction photograph or when it is judged that a bar-code is not included in S906, the apparatus informs a user of an error (S920) and terminates the process.

Figure 10:
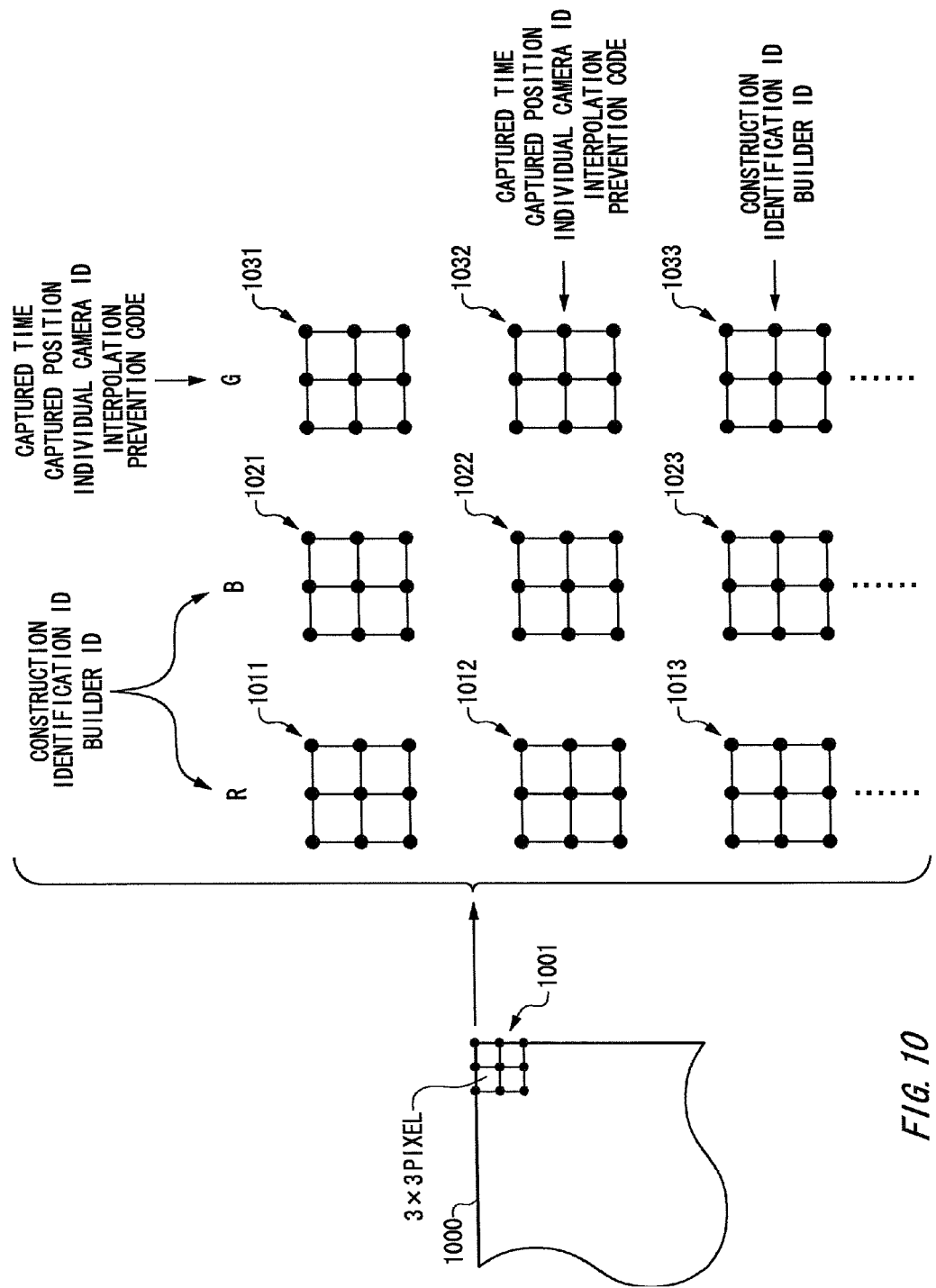
FIG. 10 is a view exemplary showing digital watermark information.

FIG. 10 is a view exemplary showing digital watermark information embedded by the image capturing apparatus 100. Hereinafter, it will be described about when a digital watermark is embedded in an image area 1001 consisting of 3 pixels*3 pixels of an image 1000. There are bit planes of the number (for example, eight for eight bits) of bit number, by which the image capturing apparatus 100 records signal strength, in the image area 1001 for each of color components of R, B, and G. Here, the bit planes are bit planes 1011, 1012, 1013, ... of a color component R, bit planes 1021, 1022, 1023, ... of a color component B, bit planes 1031, 1032, 1033, ... of a color component G. Then, nine-bit information can be embedded in one bit plane (for example, the bit plane 1011) of one color component.

The identification information recording section 812 embeds the construction identification ID and the builder ID in a bit plane of the third bit from a least significant bit. For example, the identification information recording section 812 embeds the construction identification ID and the builder ID in the bit planes 1012, 1013, 1022, and 1023 of the third bit from a least significant bit of the color components R and B. Moreover, the collateral information recording section 814 embeds collateral information such as a captured time, a captured position, an individual camera ID, and an interpolation prevention code in the bit plane 1032 that is a bit plane in a bit stream of the color component G and a bit plane lower than the bit plane embedding the construction identification ID and the builder ID. In addition, the identification information recording section 812 or the collateral information recording section 814 may embed information to be embedded in a bit plane of a lower order bit in a bit plane of the color component G.

In addition, the identification information recording section 812 and the collateral information recording section 814 can embed digital watermark information in bit planes with various pixel units aside from bit planes of 3*3 described above. Moreover, it goes without saying that the identification information recording section 812 may embed one information in a plurality of bit planes (bit planes of bit depth different from one another, a color component different from one another, or an image area different from one another). Moreover, it goes without saying that the identification information recording section 812 may embed one information by means of information consisting of a plurality of bit planes. Moreover, when the identification information acquiring section 820 extracts watermark information embedded in a blackboard for construction, e.g., from the bit plane 1011, the identification information recording section 812 may embed the identification information acquired by the identification information acquiring section 820 in another bit plane of the same image area (e.g., the bit plane 1012 or the bit plane 1021).

Moreover, the identification information recording section 812 can embed a digital watermark in an image by a method except the above. For example, the identification information recording section 812 may embed information of one bit by changing the magnitude of a brightness of a second pixel to a brightness of a first pixel in the first pixel and the second pixel adjacent to each other. For example, the identification information recording section 812 increases a brightness of the second pixel compared to a brightness of the first pixel when embedding one, and decreases a brightness of the second pixel compared to a brightness of the first pixel when embedding zero. In this way, since a brightness of adjacent pixels is generally same in most cases, it is possible to embed information without being perceived by an appreciator.

Figure 11:
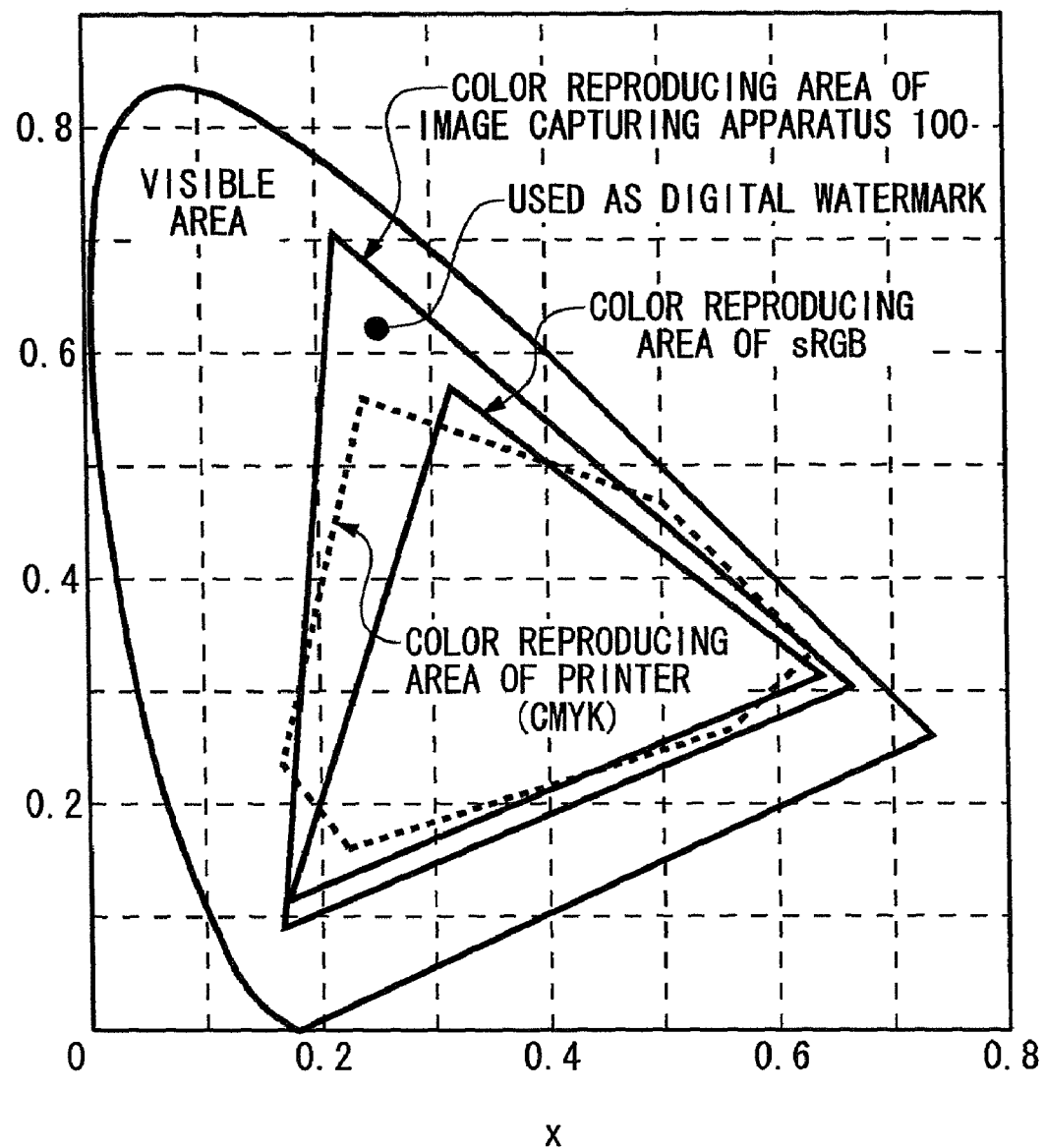
FIG. 11 is a view exemplary showing a color reproduction area.

FIG. 11 is a view exemplary showing a color reproduction area. FIG. 11 shows a color reproducing area by a printer and a color reproducing area by the image capturing apparatus 100. Moreover, a color reproducing area based on RGB is shown as reference. Then, when the object judging section 818 judges that a predetermined specific object is included in an image taken by the image capturing section 802, the identification information acquiring section 820 may extract watermark information from image data for a color gamut, which is outside a color reproducing area of a printer and inside a color reproducing area of the image capturing section 802, in an image area of the object, in order to acquire information shown by the extracted watermark information as identification information. For example, the identification information acquiring section 820 may extract watermark information from a color gamut of x=0.2~0.3 and y=0.6~0.7 in the color reproduction area. Moreover, the identification information recording section 812 may record digital watermark information in image data for the color gamut that is outside a color reproducing area of the printer and inside a color reproducing area of the image capturing section 802. In this way, it is possible to raise tolerance to interpolation, which is to take an image of a blackboard for construction photograph printed by a printer.

Figure 12:
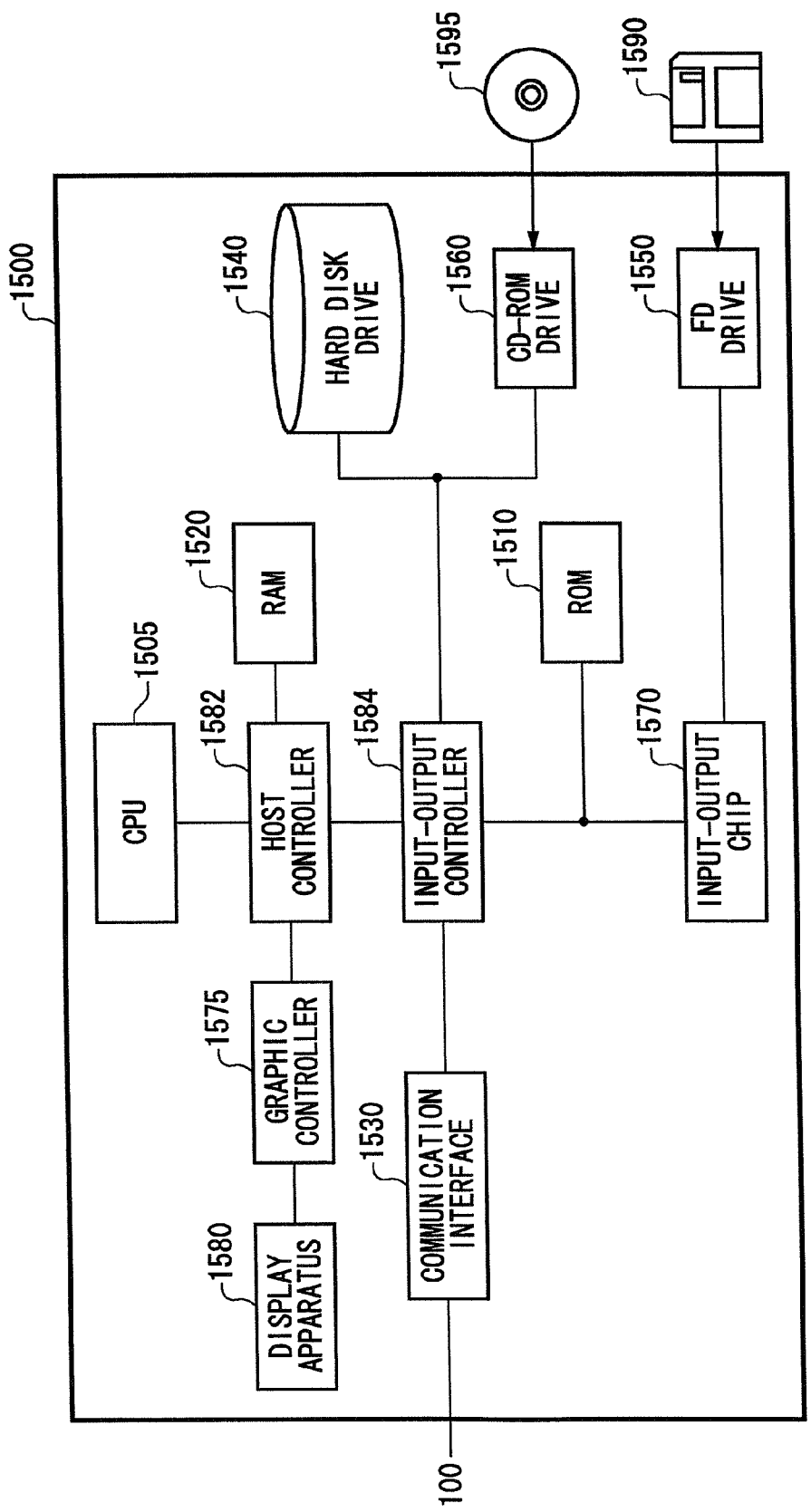
FIG. 12 is a view exemplary showing a hardware configuration of a computer according to an image capturing apparatus.

FIG. 12 is a view exemplary showing a hardware configuration of a computer 1500 according to the image capturing apparatus 100 of the present embodiment. The computer 1500 includes a CPU peripheral section having a CPU 1505, a RAM 1520, a graphic controller 1575, and a display apparatus 1580 that are connected to one another by a host controller 1582, an input-output section having a communication interface 1530, a hard disk drive 1540, and a CD-ROM drive 1560 that are connected to the host controller 1582 by an input-output controller 1584, and a legacy input-output section having a ROM 1510, a flexible disk drive 1550, and an input-output chip 1570 that are connected to the input-output controller 1584.

The host controller 1582 connects the RAM 1520 to the CPU 1505 and the graphic controller 1575 for accessing the RAM 1520 at high transfer rate. The CPU 1505 operates based on a program stored on the ROM 1510 and the RAM 1520 to control each section. The graphic controller 1575 acquires image data generated by the CPU 1505 on a frame buffer provided in the RAM 1520, and displays the data on the display apparatus 1580. Alternatively, the graphic controller 1575 may include therein the frame buffer storing the image data generated from the CPU 1505.

The input-output controller 1584 connects the host controller 1582 to the hard disk drive 1540, the communication interface 1530, and the CD-ROM drive 1560 that are a comparatively fast input-output apparatus. The hard disk drive 1540 stores a program and data to be used by the CPU 1505 in the computer 1500. The communication interface 1530 communicates with the image capturing apparatus 100 via a network, and provides the program and data to the image capturing apparatus 100. The CD-ROM drive 1560 reads a program or data from a CD-ROM 1595, and provides the program or data to the hard disk drive 1540 and the communication interface 1530 via the RAM 1520.

Moreover, the ROM 1510, the flexible disk drive 1550, and the input-output chip 1570 that are a comparatively low-speed input-output apparatus are connected to the input-output controller 1584. The ROM 1510 stores a boot program to be executed during starting the computer 1500, a program dependent on hardware of the computer 1500, or the like. The flexible disk drive 1550 reads a program or data from a flexible disk 1590, and provides the program or data to the hard disk drive 1540 and the communication interface 1530 via the RAM 1520. The input-output chip 1570 connects various kinds of input-output apparatuses via the flexible disk drive 1550, or a parallel port, a serial port, a keyboard port, a mouse port.

A program provided to the communication interface 1530 via the RAM 1520 is stored on a recording medium such as the flexible disk 1590, the CD-ROM 1595, or an IC card in order to be provided by a user. The program is read from the recording medium, is provided to the communication interface 1530 via the RAM 1520, and is sent to the image capturing apparatus 100 via a network. The program sent to the image capturing apparatus 100 is installed and executed in the image capturing apparatus 100.

The program to be installed and executed in the image capturing apparatus 100 makes the image capturing apparatus 100 function as the image capturing section 202, the image storing section 204, the object extracting section 206, the characteristic amount computing section 208, the characteristic amount storing section 210, the object identification information storing section 212, the characteristic amount comparing section 214, the coincidence judging section 218, the object identification information selecting section 220, the image extracting section 222, the display section 224, the mode selecting section 230, the mark display controlling section 232, the focusing area extracting section 234, and the frame extracting section 236, described in FIGS. 1 to 6. Moreover, the program to be installed and executed in the image capturing apparatus 100 makes the image capturing apparatus 100 function as the image capturing section 802, the object extracting section 806, the object judging section 818, the identification information acquiring section 820, the identification information recording section 812, the collateral information recording section 814, the time acquiring section 830, and the position acquiring section 840, described in FIGS. 7 to 11.

A program described above may be stored on an outside storage medium. A storage medium can include an optical recording medium such as DVD or PD, a magneto-optical recording medium such as MD, a tape medium, a semiconductor memory such as an IC card, in addition to the flexible disk 1590 and the CD-ROM 1595. Moreover, a storage device such as a hard disk or a RAM provided in a server system connected to a private communication network or an Internet may be used as a recording medium, and the program may be provided to the computer 1500 via a network.

According to an aspect of the present invention, it is possible to provide an image capturing apparatus that automatically registers a taken object.

Although the present invention has been described by way of some exemplary embodiments, it should be understood that those skilled in the art might make many changes and substitutions without departing from the spirit and the scope of the present invention. It is obvious from the definition of the appended claims that embodiments with such modifications also belong to the scope of the present invention.

What is claimed is:

1. An image capturing apparatus comprising:
   an image capturing section that takes an image;
   an object extracting section that extracts an object included in the image taken by said image capturing section;
   a characteristic amount computing section that computes an amount of characteristic of the object extracted from said object extracting section based on the image with the object extracted from said object extracting section;
   a characteristic amount storing section that stores the amount of characteristic of the object computed from said characteristic amount computing section in association with object identification information identifying the object;
   an object identification information storing section that stores the object identification information identifying the object included in the image in association with the image taken by said image capturing section;
   an object identification information selecting section that selects one object identification information from a plurality of object identification information stored on said object identification information storing section based on instruction input from a user;
   an image extracting section that extracts at least one image stored on said object identification information storing section in association with the object identification information selected by said object identification information selecting section; and
   a display section that displays at least one image extracted from said image extracting section;
   wherein
   the image capturing apparatus further comprises:
   a characteristic amount comparing section that compares an amount of characteristic of an object included in an image taken by said image capturing section and the amount of characteristic of the object stored on said characteristic amount storing section to compute a degree of coincidence of the objects; and
   a coincidence judging section that judges whether the degree of coincidence of objects computed from said characteristic amount comparing section is not less than a predetermined reference value,
   said object identification information storing section stores the object identification information stored on said characteristic amount storing section in association with the image taken by said image capturing section when said coincidence judging section judges that the degree of coincidence of the object computed from said characteristic amount comparing section is not less than the predetermined reference value,
   wherein when the image capturing section takes a new image, the coincidence judging section does not compute a degree of coincidence, and the characteristic amount storing section assigns temporary object identification information to the object extracted from the object extracting section and stores an amount of characteristic in association with the temporary object identification information.

2. The image capturing apparatus as claimed in claim 1, wherein
   said characteristic amount computing section computes a color of the object extracted from said object extracting section as an amount of characteristic,
   said characteristic amount storing section stores the color of the object computed from said characteristic amount computing section in association with object identification information,
   said characteristic amount comparing section compares a color of an object included in an image newly taken by said image capturing section and the color of the object stored on said characteristic amount storing section to compute a degree of coincidence of objects, and
   said coincidence judging section judges whether the degree of coincidence of objects computed from said characteristic amount comparing section is not less than the predetermined reference value.

3. The image capturing apparatus as claimed in claim 1, wherein
   said object identification information storing section stores a plurality of object identification information in association with object group identification information identifying a group of objects, and
   said object identification information selecting section selects one object group identification information from a plurality of object group identification information stored on said object identification information storing section based on instruction input from the user and then selects one object identification information from the plurality of object identification information stored on said object identification information storing section based on instruction input from the user in association with the selected object group identification information.

4. The image capturing apparatus as claimed in claim 1, wherein
   the image capturing apparatus further comprises a mode selecting section that selects a registration mode that is a mode for taking an object making said characteristic amount computing section compute an amount of characteristic to make said characteristic amount storing section store the amount of characteristic or an image capturing mode that is a mode for taking an image associated with object identification information stored on said object identification information storing section,
   said characteristic amount storing section stores the amount of characteristic of the object computed from said characteristic amount computing section in association with object identification information when said mode selecting section selects the registration mode, said characteristic amount comparing section compares the amount of characteristic of the object included in the image taken by said image capturing section when said mode selecting section selects the image capturing mode and the amount of characteristic of the object stored on said characteristic amount storing section when said mode selecting section select the registration mode to compute a degree of coincidence of objects, said coincidence judging section judges whether the degree of coincidence of objects computed from said characteristic amount comparing section is not less than the predetermined reference value, and said object identification information storing section stores the object identification information stored on said characteristic amount storing section when said mode selecting section selects the registration mode in association with the image newly taken by said image capturing section when said coincidence judging section judges that the degree of coincidence of the object computed from said characteristic amount comparing section is not less than the predetermined reference value.

5. The image capturing apparatus as claimed in claim 1, wherein the image capturing apparatus further comprises:

a display section that displays an image capturing area of said image capturing section; and a mark display controlling section that superimposes and displays a mark indicative of an area, in which an object making said characteristic amount computing section compute an amount of characteristic to make said characteristic amount storing section store the amount of characteristic should be taken, on the image capturing area of said image capturing section in said display section, said characteristic amount computing section computes an amount of characteristic of an object in the area shown by the mark that is included in the image taken by said image capturing section and is displayed by said mark display controlling section, and said characteristic amount storing section stores the amount of characteristic of the object computed from said characteristic amount computing section in association with object identification information identifying the object.

6. The image capturing apparatus as claimed in claim 1, wherein the image capturing apparatus further comprises a focusing area extracting section that extracts a focusing area that is an area focused in the image taken by said image capturing section, said object extracting section extracts an object included in the focusing area extracted from said focusing area extracting section, and said characteristic amount computing section computes an amount of characteristic of the object extracted by said object extracting section from the focusing area based on the image with the object extracted by said object extracting section from the focusing area.

7. The image capturing apparatus as claimed in claim 1, wherein said image capturing section takes a moving image, said object extracting section extracts an object included in each frame of the moving image taken by said image capturing section, and said object identification information storing section stores object identification information identifying the object included in each frame in association with each frame of the moving image taken by said image capturing section.

8. The image capturing apparatus as claimed in claim 7, further comprising:

an object identification information selecting section that selects one object identification information from a plurality of object identification information stored on said object identification information storing section based on instruction input from the user;

a frame extracting section that extracts at least one frame stored on said object identification information storing section in association with the object identification information selected by said object identification information selecting section; and a display section that displays at least one image extracted from said frame extracting section.

9. An image capturing method comprising:

an image capturing step of taking an image;

an object extracting step of extracting an object included in the image taken in said image capturing step;

a characteristic amount computing step of computing an amount of characteristic of the object extracted in said object extracting step based on the image with the object extracted in said object extracting step;

a characteristic amount storing step of storing the amount of characteristic of the object computed in said characteristic amount computing step in association with object identification information identifying the object;

an object identification information storing step of storing the object identification information identifying the object included in the image in association with the image taken in said image capturing step;

an object identification information selecting step that selects one object identification information from a plurality of object identification information based on instruction input from a user;

an image extracting step that extracts at least one image in association with the object identification information selected by said object identification information selecting step; and a display step that displays at least one image extracted from said image extracting step;

wherein the image capturing method further comprises:

a characteristic amount comparing step that compares an amount of characteristic of an object included in an image taken in said image capturing step and the amount of characteristic of the object stored on said characteristic amount storing step to compute a degree of coincidence of the objects; and a coincidence judging step that judges whether the degree of coincidence of objects computed from said characteristic amount comparing section is not less than a predetermined reference value, said object identification information storing section stores the object identification information stored in said characteristic amount storing step in association with the image taken in said image capturing step when said coincidence judging step judges that the degree of coincidence of the object computed from said characteristic amount comparing step is not less than the predetermined reference value; and when a new image is taken in the image capturing step, the coincidence judging step does not compute a degree of coincidence, and the characteristic amount storing step assigns temporary object identification information to the object extracted in the object extracting step and stores an amount of characteristic in association with the temporary object identification information.

10. A non-transitory computer readable medium storing thereon a program executable to implement an image capturing apparatus that takes an image, the program making the image capturing apparatus function as:

an image capturing section that takes an image;

an object extracting section that extracts an object included in the image taken by said image capturing section;

a characteristic amount computing section that computes an amount of characteristic of the object extracted from said object extracting section based on the image with the object extracted from said object extracting section;

a characteristic amount storing section that stores the amount of characteristic of the object computed from said characteristic amount computing section in association with object identification information identifying the object;

an object identification information storing section that stores the object identification information identifying the object included in the image in association with the image taken by said image capturing section;

an object identification information selecting section that selects one object identification information from a plurality of object identification information stored on said object identification information storing section based on instruction input from a user;

an image extracting section that extracts at least one image stored on said object identification information storing section in association with the object identification information selected by said object identification information selecting section; and a display section that displays at least one image extracted from said image extracting section;

wherein the image capturing apparatus further comprises:

a characteristic amount comparing section that compares an amount of characteristic of an object included in an image taken by said image capturing section and the amount of characteristic of the object stored on said characteristic amount storing section to compute a degree of coincidence of the objects; and a coincidence judging section that judges whether the degree of coincidence of objects computed from said characteristic amount comparing section is not less than a predetermined reference value, said object identification information storing section stores the object identification information stored on said characteristic amount storing section in association with the image taken by said image capturing section when said coincidence judging section judges that the degree of coincidence of the object computed from said characteristic amount comparing section is not less than the predetermined reference value and wherein when the image capturing section takes a new image, the coincidence judging section does not compute a degree of coincidence, and the characteristic amount storing section assigns temporary object identification information to the object extracted from the object extracting section and stores an amount of characteristic in association with the temporary object identification information.

\* \* \* \* \*